United States Patent Office 3,163,675
Patented Dec. 29, 1964

3,163,675
PREPARATION OF TRANS 1,2-DIAMINO-
CYCLOHEXANE
Andrew I. Smith, Raleigh, N.C., assignor to Monsanto
Company, a corporation of Delaware
No Drawing. Filed Dec. 28, 1961, Ser. No. 162,950
5 Claims. (Cl. 260—563)

This invention relates to the preparation of trans 1,2-diaminocyclohexane, and more specifically to the separation of trans 1,2-diaminocyclohexane from stereoisomeric mixtures of cis and trans 1,2-diaminocyclohexane, which mixtures may also contain additional minor impurities.

The 1,2-diaminocyclohexanes are known compounds which are valuable intermediate products for the production of dyestuffs, textile assistants, fungicides, pesticides and pharmaceutical products.

Various methods have been proposed for the production of 1,2-diaminocyclohexane, e.g., the reduction of o-phenylenediamine and the reduction of 1,2-dinitrocyclohexane. Most of these prior art methods result in the production of a stereoisomeric mixture of cis and trans 1,2-diaminocyclohexane in varying proportions. Such mixtures of isomers are also produced by fractionating impurity concentrate streams which are discarded during the preparation of refined hexamethylenediamine by hydrogenation of adiponitrile for nylon manufacture.

In a typical purification of hexamethylene diamine prepared by hydrogenation of adiponitrile there is recovered an impurity stream which is presently discarded composed of water (9%), hexamethyleneimine (6%), hexamethylene diamine (67%), 1,2 - diaminocyclohexane (17%) and trace amounts of other materials. By fractionating this mixture a reasonably pure 1,2-diaminocyclohexane fraction may be obtained and this is a very economical source of trans 1,2-diaminocyclohexane, if the product can be separated from the cis isomer and from the various impurities associated therewith.

Though it has been desired to separate pure trans and cis 1,2-di-aminocyclohexane from such isomeric mixtures as discussed above for purposes of conducting characterization and chemical tests, no economically attractive method has heretofore been developed. Though separation of the two isomers has been attempted by fractional distillation, it has been found that satisfactory separation cannot be obtained even when using a 100 theoretical plate distillation column at reduced pressures as low as 50 mm.

It is an object of the present invention to provide a method for the preparation of pure trans 1,2-diaminocyclohexane by the separation thereof from a mixture containing both the cis and trans isomeric forms of 1,2-diaminocyclohexane.

It is a further object of this invention to provide such a process which is simple, economical and efficient.

It is a further object of this invention to provide a method for the preparation of trans 1,2-diaminocyclohexane which involves the separation thereof from a mixture containing both cis and trans isomers of 1,2-diaminocyclohexane as well as other minor impurities which may be present when the diaminocyclohexane is obtained by fractionation from the diaminocyclohexane-containing by-product discarded in the commercial preparation of hexamethylene diamine by hydrogenation of adiponitrile.

It is a further object of this invention to provide a method for the separation of the trans and cis isomers of 1,2-diaminocyclohexane from one another wherein each isomeric form may be recovered in a substantially pure state.

Still further objects and advantages of the present invention will become apparent from the detailed description given hereinafter. It should be understood, however, that the detailed description and specific examples, while indicating preferred embodiments, are given by way of illustration only, since various changes and modifications within the spirit and scope of the invention will become apparent to those skilled in the art.

The above objects are accomplished according to this invention by reacting an isomeric mixture of cis and trans 1,2-diaminocyclohexane with at least an equivalent amount of benzil (1,2-diphenylethanedione) to form the cis and trans hexahydro-2,3-diphenyl quinoxalines. It has been found that the trans quinoxaline isomer is substantially less soluble in the mother liquor, and will form a precipitate which is easily removed from the remaining solution by filtration. The trans hexahydro-2,3-diphenyl quinoxaline isomer is then hydrolyzed in a mineral acid solution, the liberated benzil filtered off, the acid salt of trans 1,2-diaminocyclohexane recovered and treated with an alkaline solution to obtain the desired trans 1,2-diaminocyclohexane.

The first step of the process may be conveniently conducted by dissolving benzil and the isomeric mixture of 1,2-diaminocyclohexane in a suitable solvent and refluxing the mixture until substantially the theoretical quantity of water liberated by the reaction is collected. Various solvents may be employed including aliphatic ethers, e.g. ethylene glycol monoethyl ether, aromatic hydrocarbons, e.g. toluene, xylene and benzene and any other organic solvents exhibiting differential solubility for the trans and cis hexahydro-2,3-diphenyl quinoxalines and from which the water of reaction can be continuously removed, e.g. solvents which possess a boiling point above 100° C. or which form a water azeotrope which can be distilled. Many organic solvents possess these properties and they can readily be determined by a simple laboratory trial.

After completion of the reflux operation the solution is permitted to cool whereupon the trans hexahydro-2,3-diphenyl quinoxaline isomer precipitates in the form of crystals. To insure maximum precipitation the mixture should be permitted to stand for several hours at room temperature or below. This may conveniently be done by permitting the mixture to stand overnight. The precipitate is then removed from the solution, e.g., by filtration under suction, decantation, centrifugation, or other known means, and washed with fresh solvent before drying.

To obtain increased yields the mother liquor, from which the crystals described above have been separated, may be further evaporated to approximately ½ volume whereupon additional crystals are obtained upon cooling. The total quantity of recovered crystals may then be purified by recrystallization from one or more of the suitable solvents indicated above.

The trans hexahydro-2,3-diphenyl quinoxaline crystals obtained in the previous steps are subjected to hydrolysis by the addition thereto of an aqueous solution of a mineral acid, e.g., hydrochloric acid, sulfuric acid, phosphoric acid; and the hydrolysis mixture is preferably gently heated, e.g. 75°–90° C., whereupon the liberated benzil precipitates.

After separation of the precipitated benzil by suitable means, such as filtration, centrifugation, etc., the remaining solution is rendered alkaline by addition of an aqueous alkaline solution, such as a solution of sodium hydroxide, potassium hydroxide or ammonium hydroxide to a pH of at least 8.0 in order to neutralize the mineral acid salt and produce free trans 1,2-diaminocyclohexane. If it is desired for economy and efficiency of recovery to reduce the quantity of water present the aqueous solution of the mineral acid salt is adjusted to neutral or slightly acid and the solution evaporated to dryness. The mineral acid salt of the trans 1,2-diaminocyclohexane is thereby maintained during the evaporation and avoids the possible danger of oxidation or degradation of the free diaminocyclohexane due to heating for evaporation. After evaporating the solution to dryness, additional alkaline solution is then added to the solid residue to render the resultant solution alkaline, e.g. to a pH of at least 8.0. This serves to produce the free trans 1,2-diaminocyclohexane in a mixture containing relatively little water. The final alkaline hydroxide solution can be of the same concentration as the first employed or as dilute as required to produce a mixture with the desired amount of water.

Following the addition of the aqueous alkaline solution in sufficient quantity to render the mixture alkaline, whether or not the salt solution has been evaporated to dryness, it is noted that three phases are formed. These phases comprise an upper layer of trans 1,2-diaminocyclohexane and water, a middle phase of an aqueous solution of salt, excess alkali hydroxide and diaminocyclohexane, and a solid phase of precipitated salt. The upper phase contains substantially all of the trans 1,2-diaminocyclohexane and can be decanted and dried to yield a relatively pure product. But for most efficient recovery it is preferred that the upper and middle phases be extracted with a suitable solvent such as ether or ether-alkanol mixtures, e.g. ether-butanol, ether-pentanol, etc. The extract solution is then concentrated by evaporation of the ether or ether-alkanol mixtures to obtain a substantially pure trans 1,2-diaminocyclohexane in high yield. If a product of the highest purity is desired the concentrated extract solution can be fractionated to yield very high purity trans 1,2-diaminocyclohexane.

When it is also desired to recover cis 1,2-diaminocyclohexane, the mother liquors remaining after the separation of the trans hexahydro-2,3-diphenyl quinoxaline crops may be further concentrated to a volume of less than ½ and thereafter cooled to precipitate the cis hexahydro-2,3-diphenyl quinoxaline isomer. This precipitate may be washed and further purified in a manner substantially analogous to that described above in connection with treatment of the trans isomer, and thereafter hydrolyzed with mineral acid to liberate the mineral acid salt of cis 1,2-diaminocyclohexane. This salt is then treated with alkaline solution as described above to liberate cis 1,2-diaminocyclohexane.

The degree of purity in which the trans and cis isomers of 1,2-diaminocyclohexane are obtained by the process of this invention, i.e. the freedom from the presence of the other, will depend in large measure upon the degree to which the solution of hexahydro-2,3-diphenyl quinoxalines is evaporated before cooling. In other words, when it is desired to obtain the trans isomer in substantially pure form, care should be taken to avoid too much evaporation of the mother liquors since the cis form of hexahydro-2,3-diphenyl quinoxaline will precipitate in that event. When it is desired to obtain the cis isomer in substantially pure form, care should be taken to evaporate the mother liquor containing the hexahydro-2,3-diphenyl quinoxalines to a sufficient degree so that practically all of the trans isomer is precipitated upon cooling whereby only the cis isomer will remain in the solution. The volume to which the solution should be evaporated will depend, of course, not only on the difference in solubility of the cis and trans hexahydro-2,3-diphenyl quinoxalines, but also the ratio of the cis and trans 1,2-diaminocyclohexanes in the original mixture, as well as the purpose of the process, i.e., to obtain the cis or trans 1,2-diaminocyclohexane in the most highly purified state. The most desirable degree of evaporation is easily determined by a routine sample experiment, before treating an entire batch.

The following examples are given to more particularly illustrate the process of this invention. All products and percentages are by weight unless otherwise indicated.

EXAMPLE I

A. *Recovery of Trans 1,2-Diaminocyclohexane*

To a flask containing 345 ml. of benzene there were added 86.5 grams of benzil with stirring. To this solution there were added 50 ml. of a semi-refined mixture of 1,2-diaminocyclohexane isomers containing the cis and trans isomers in an approximate ratio of 1:2. The solution was refluxed for six hours at 130° C. during which time 13.7 ml. of water were collected in a Dean-Stark trap. The theoretical quantity of water for complete reaction would have been 14.8 mil. After permitting the solution to cool at room temperature over night, yellow crystals precipitated, were recovered by suction filtration and washed with fresh benzene before drying at room temperature. The weight of the recovered yellow crystalline product was 39.1 grams or 49.2 percent of the theoretical from the starting trans 1,2-diaminocyclohexane.

The mother liquor remaining after the separation of the crystals was then evaporated to a volume of 200 ml. and again cooled to room temperature over night, whereupon an additional, 24 grams of yellow crystals were obtained. The mother liquors were set aside for later use while the two crystals crops were combined and twice recrystallized from approximately 1100 ml. of absolute ethanol to obtain a final yield of 41.8 grams. The product had a melting point of 173–175° C. as determined on a Fisher-Johns hot stage melting point apparatus, and constituted substantially pure trans hexahydro-2,3-diphenyl quinoxaline. The yield of crystals was 52.8% of the theoretical from the starting trans 1,2-diaminocyclohexane present in the mixture.

Twenty grams of the above crystalline product was placed in a 500 ml. flask fitted with a stirrer, to which was then added 50 ml. of water, 25 ml. of concentrated hydrochloric acid followed by the addition of 25 more ml. of water. The reaction mixture was heated slowly up to 81° C. and then permitted to cool to 70° C. During the hydrolysis reaction, it was noted that the liberated benzil appeared to agglomerate during heating.

After cooling the solution was suction filtered to separate the benzil which weighed 14.5 grams when dry. (Theoretical, 14.58.) The remaining solution was then treated by the addition of a 50% sodium hydroxide solution until the pH reached a value of 7.0. The neutral solution was evaporated to dryness and the solid residue was then made alkaline by the addition of 20 ml. of 50 percent sodium hydroxide solution. The above evaporation was deemed convenient to remove the large quantity of water in which the hydrochloride of the diaminocyclohexane was dissolved. Twenty ml. of water were then added to the alkaline mixture so that it could be handled more easily, and there was noted the formation of three phases: an upper trans 1,2-diaminocyclohexane-water layer, an aqueous-salt-caustic-1,2-diaminocyclohexane phase, and a solid salt phase. The two liquid phases were decanted into a separatory funnel and then extracted with eight successive 25 ml. portions of ether before the upper 1,2-diaminocyclohexane-water phase disappeared.

Upon evaporation of these combined ether extracts, there was obtained 5.2 grams of trans 1,2-diaminocyclohexane which partially solidified at room temperature. Upon extraction of the aqueous phase with two additional 25 ml. portions of ether, followed by evaporation of the ether, an additional 1.6 grams of trans 1,2-diaminocyclohexane was obtained. The total yield of the trans-isomer was 6.8 grams, or 98 percent of theory. The product was shown by gas chromatography to be pure trans 1,2-diaminocyclohexane containing no cis isomer or any other discernable impurities.

B. *Recovery of Cis 1,2-Diaminocyclohexane*

The 200 ml. of mother liquors remaining after separation of the two crops of the trans isomer derivative as described above were concentrated to a volume of about 75 ml. by evaporation. This solution was cooled to a temperature of 5° C. in a refrigerator overnight and a third crystal crop, weighing 19.0 grams was recovered. The mother liquor remaining after this separation was evaporated to leave 33 grams of a solid residue which was washed by stirring with 75 ml. of water and then washed on the filter with the same water used to rinse the flask. The wash water was basic and discolored, thus showing that an impurity or impurities were removed.

The washed residue was then hydrolyzed with hydrochloric acid solution and cis 1,2-diaminocyclohexane liberated from the resultant salt solution with alkaline hydroxide solution in the same manner as described above for the treatment of the trans isomer. The 1,2-diaminocyclohexane product was fractionally distilled, and the main fraction was shown by gas chromatography to consist in the main, e.g. about 75%, of the cis form, but appreciable amounts of the trans isomer were also present, as would be expected from the degree of evaporation of the solution of the trans and cis hexahydro-2,3-diphenyl quinoxalines carried out.

EXAMPLE II

In this example 100 ml. of an isomeric 1,2-diaminocyclohexane concentrate comprising approximately two volumes of trans per volume of cis isomer and prepared by fractionation of a semi-refined diaminocyclohexane fraction obtained from an impurity stream normally discarded during the manufacture of hexamethylene diamine by hydrogenation of adiponitrile, were reacted with 173 grams of benzil using 400 ml. of toluene as a solvent. The solution was maintained under reflux for a period of 1 hour during which time 28 ml. of water of reaction was removed azeotropically. Reflux was then continued for an additional hour to insure complete reaction, after which the mixture was cooled to room temperature and permitted to stand overnight. The crop of crystals, M.P. 168–172° C., which was removed by suction filtration weighed 136.3 grams. This product was recrystallized from 175 ml. of fresh toluene and then from absolute ethanol, using 90 ml. of alcohol per 5 grams of crystals. The final crystal product, M.P. 173–174° C., weighed 90.5 grams which constituted a 57.1 percent yield of the theoretical from the starting trans 1,2-diaminocyclohexane present in the original mixture.

The trans hexahydro-2,3-diphenyl quinoxaline crystals derived from trans 1,2-diaminocyclohexane as just described were then hydrolyzed and purified in a manner similar to that described in connection with Example I to yield trans 1,2-diaminocyclohexane of essentially the same purity as that obtained in Example I above.

It is seen from the above examples and description that this invention provides a simple, economical and efficient method for the separation of pure trans 1,2-diaminocyclohexane from stereo-isomeric mixtures containing both the cis and trans forms of 1,2-diaminocyclohexane. Moreover, the cis 1,2-diaminocyclohexane remaining after separation of the trans form may also be recovered in a state of high purity.

It is apparent that numerous widely varying embodiments of this invention may be made without departing from the spirit and scope thereof and therefore it is not intended to be limited except as indicated in the appended claims. For example, instead of employing ether as the extracting solvent to recover liberated trans 1,2-diamino-cycolhexane from the hydrolyzed acid salt as described in Example I, mixtures of ether and n-butanol or n-pentanol can be employed. Thus, 9:1 and 4:1 mixtures of ether:n-butanol by volume can be employed. Also, the upper liquid layer of the liberated trans 1,2-diaminocyclohexane remaining after hydrolysis of the mineral acid salt can be fractionally distilled and thus only the middle aqueous phase need be extracted to achieve quantitative recovery of the trans-isomer. Other variations such as these will be apparent to those skilled in the art and the invention is not to be considered as limited except as stated in the claims.

I claim:

1. A process for separating pure trans 1,2-diaminocyclohexane from a mixture comprising trans 1,2-diaminocyclohexane and cis 1,2-diaminocyclohexane, comprising reacting benzil with a solution of said mixture in an organic solvent selected from the group consisting of ethylene glycol monoethyl ether, toluene, xylene, and benzene, cooling the resulting reaction mixture to precipitate trans hexahydro-2,3-diphenyl quinoxaline therefrom, separating said precipitate from the reaction mixture, hydrolyzing the trans hexahydro-2,3-diphenyl quinoxaline in aqueous mineral acid solution to form the acid salt of trans 1,2-diaminocyclohexane, and thereafter treating said salt with an aqueous alkaline hydroxide solution to liberate substantially pure trans 1,2-diaminocyclohexane.

2. The process according to claim 1 wherein the reaction mixture mother liquor remaining after removal of the precipitated trans hexahydro-2,3-diphenyl quinoxaline is evaporated, concentrated and thereafter cooled to precipitate cis hexahydro-2,3-diphenyl quinoxaline therefrom, the said precipitate is separated from the said mother liquor, hydrolyzed in aqueous mineral acid solution to form the acid salt of cis 1,2-diaminocyclohexane, and the said salt is treated with an aqueous alkaline hydroxide solution to liberate cis 1,2-diaminocyclohexane.

3. A process for separating pure trans 1,2-diaminocyclohexane from a mixture comprising trans 1,2-diaminocyclohexane and cis 1,2-diaminocyclohexane, comprising reacting benzil with a solution of said mixture in an organic solvent selected from the group consisting of ethylene glycol monoethyl ether, toluene, xylene, and benzene, cooling the resulting reaction mixture to precipitate trans hexahydro-2,3-diphenyl quinoxaline therefrom, separating said precipitate from the reaction mixture, hydrolizing the trans hexahydro-2,3-diphenyl quinoxaline in aqueous hydrochloric acid solution to form the hydrochloride of trans 1,2-diaminocyclohexane, and thereafter treating said hydrochloride with aqueous sodium hydroxide solution to liberate substantially pure trans 1,2-diaminocyclohexane.

4. A process for separating pure trans 1,2-diaminocyclohexane from a mixture comprising trans 1,2-diaminocyclohexane and cis 1,2-diaminocyclohexane, comprising reacting benzil with a solution of said mixture in an organic solvent selected from the group consisting of ethylene glycol monoethyl ether, toluene, xylene, and benzene, cooling the resulting reaction mixture to precipitate trans hexahydro-2,3-diphenyl quinoxaline therefrom, separating said precipitate from the reaction mixture, hydrolyzing the trans hexahydro-2,3-diphenyl quinoxaline in aqueous hydrochloric acid solution to form the hydrochloride of trans 1,2-diaminocyclohexane, and thereafter treating said hydrochloride with aqueous sodium hydroxide solution to liberate substantially pure trans 1,2-diaminocyclohexane, extracting the liquid phases of the resulting mixture with a medium selected from the group consisting of ether and ether-alkanol mixtures and evaporating the extractant to obtain substantially pure trans 1,2-diaminocyclohexane.

5. The process according to claim 2 wherein the liquid phases of the reaction mixture of the aqueous alkaline hydroxide solution with the acid salt of cis 1,2-diaminocyclohexane is extracted with a medium selected from the group consisting of ether and ether-alkanol mixtures and the extractant is evaporated to obtain cis 1,2-diaminocyclohexane.

References Cited in the file of this patent

UNITED STATES PATENTS

| | | |
|---|---|---|
| 2,511,028 | Whitman | June 13, 1950 |
| 2,576,959 | May et al. | Dec. 4, 1951 |

FOREIGN PATENTS

| | | |
|---|---|---|
| 1,054,999 | France | Oct. 14, 1953 |

OTHER REFERENCES

Einborn et al.: Ann. der Chem., vol. 295, pp. 209–222 (1897).

Tichy et al.: Collection Czechoslav. Chem. Commins, vol. 24, pp. 3434–3431 (1959).